(12) United States Patent  (10) Patent No.: US 8,290,848 B2
Duffus et al.  (45) Date of Patent: Oct. 16, 2012

(54) SYSTEM AND METHOD FOR ESTABLISHING AN INDEX FOR SPECTRUM USED TO SUPPORT WIRELESS COMMUNICATIONS

(75) Inventors: Christian L. Duffus, Washington, DC (US); Jeffrey C. Schmidt, Orlando, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 288 days.

(21) Appl. No.: 12/773,162

(22) Filed: May 4, 2010

(65) Prior Publication Data

US 2010/0287107 A1  Nov. 11, 2010

Related U.S. Application Data

(60) Provisional application No. 61/215,455, filed on May 6, 2009.

(51) Int. Cl.
*G06Q 40/00* (2006.01)
(52) U.S. Cl. .......................... 705/36 R; 705/35; 705/500
(58) Field of Classification Search .................... 705/35, 705/36 R, 37, 500
See application file for complete search history.

(56) References Cited

U.S. PATENT DOCUMENTS

| | | | | |
|---|---|---|---|---|
| 7,343,334 | B1* | 3/2008 | Adduci et al. | 705/36 R |
| 7,349,880 | B1 | 3/2008 | Kitao | |
| 7,415,434 | B2* | 8/2008 | Adduci et al. | 705/36 R |
| 7,962,511 | B2* | 6/2011 | Barney | 707/776 |
| 2002/0002523 | A1* | 1/2002 | Kossovsky et al. | 705/36 |
| 2002/0002524 | A1* | 1/2002 | Kossovsky et al. | 705/36 |
| 2002/0004775 | A1* | 1/2002 | Kossovsky et al. | 705/37 |
| 2004/0054551 | A1* | 3/2004 | Ausubel et al. | 705/1 |
| 2007/0033127 | A1* | 2/2007 | Masuyama et al. | 705/36 R |
| 2007/0083402 | A1* | 4/2007 | Masuyama et al. | 705/7 |
| 2007/0094117 | A1* | 4/2007 | Masuyama et al. | 705/36 R |
| 2007/0265907 | A1* | 11/2007 | Adduci et al. | 705/10 |
| 2008/0168005 | A1* | 7/2008 | Masuyama et al. | 705/36 R |
| 2008/0183634 | A1 | 7/2008 | Sadler | |
| 2008/0215474 | A1* | 9/2008 | Graham | 705/37 |
| 2008/0288416 | A1* | 11/2008 | Arnott et al. | 705/36 R |
| 2009/0307148 | A1* | 12/2009 | Cardoza et al. | 705/36 R |
| 2010/0145862 | A1* | 6/2010 | Chang | 705/80 |
| 2012/0084295 | A1* | 4/2012 | Cardoza et al. | 707/741 |

OTHER PUBLICATIONS

"How Much is Your Spectrum Worth"; Apr. 24, 2009, Spectrum Bridge Blog; Availabe at: http://spectrumbridge.blogspot.com/2009/04/how-much-is-your-spectrum-worth.html.*
Paul Milgrom, "Putting Auction Theory to Work: The Simulteneous Ascending Auction" Journal of Political Economy, vol. 108, No. 2 (Apr. 2000), pp. 245-272.*
Bishop Cheen, "Monetizing the Hidden Value in TV Spectrum", High Yield Research, Jul. 3, 2000.*
Saul Hansell. "Verizon Licks Its Cheap Megahertz Pops", New York Times, Mar. 21, 2008.*
Peter Cramton, "Estimating Auction Revenues for the Proposed FCC Sale of 3G Spectrum for Broadband and Advanced Wireless Services", Dec. 3, 2003.*

(Continued)

*Primary Examiner* — Ryan D Donlon
(74) *Attorney, Agent, or Firm* — Renner, Otto, Boisselle & Sklar, LLP

(57) ABSTRACT

Disclosed are a system, a computer readable medium and a method for determining a spectrum index value as a function of financial data for a plurality of selected publically traded companies and spectrum-related data for the selected companies.

14 Claims, 1 Drawing Sheet

OTHER PUBLICATIONS

Calabrese et al., "There is No Windfall in the White Space, The Economics of Auctioning DTV White Space Spectrum" New America Foundation, Sep. 2008.*
Tim Farrar, "New mobile satellite services: valuing spectrum assets", Oct. 2007.*
Andrew Bary, "Opportunity Calling" BARRONS.com, June 27, 2005.*
Donny Jackson, "Spectrum Bridge Creates New Financial Index for Spectrum Assets", UrgentComm.com, May 14, 2009.*
Kris Van Bruwaene "Estimating the value of spectrum", EBU Technical Review, Apr. 2003.*
Stone et al., "Wireless Spectrum: Invisible Real Estate" Near Earlth LLC Feb. 2008.*
Kwerel, Evan et al., "A Proposal for a Rapid Transition to Market Allocation of Spectrum", Federal Communications Commission, 2002, OPP Working Paper No. 38, pp. 1-50.
By the Commission, "Second Report and Order, Order on Reconsideration, and Second Further Notice of Proposed Rulemaking", Federal Communications Commission, 2004, FCC 04-167, WT Docket No. 00-230, pp. 1- 180.
Mcknight, Lee et al., "Best Effort versus Spectrum Markets: Wideband and Wi-Fi versus 3G MVNOs?", pp. 1-18.
Prabhu, Krish et al., "Time for Action" Genuine Ideas, 2002, [retrieved online Feb. 1, 2008], <http://www.genuineideas.com/ArticlesIndex/TimeForAction.htm>.
FCC 08-260, Second Report and Order and Memorandum Opinion and Order, Adopted Nov. 4, 2008 and Released Nov. 14, 2008.
"Digital Dividend: Cognitive Access, Consultation on License-Exempting Cognitive Devices using Interleaved Spectrum", Ofcom, Publication Date: Feb. 16, 2009.
U.S. Spectrum Management Policy: Agenda for the Future, 1991.
Radio Spectrum Management, Module 5 of ICT Regulation Toolkit, ITU, 2007.

* cited by examiner

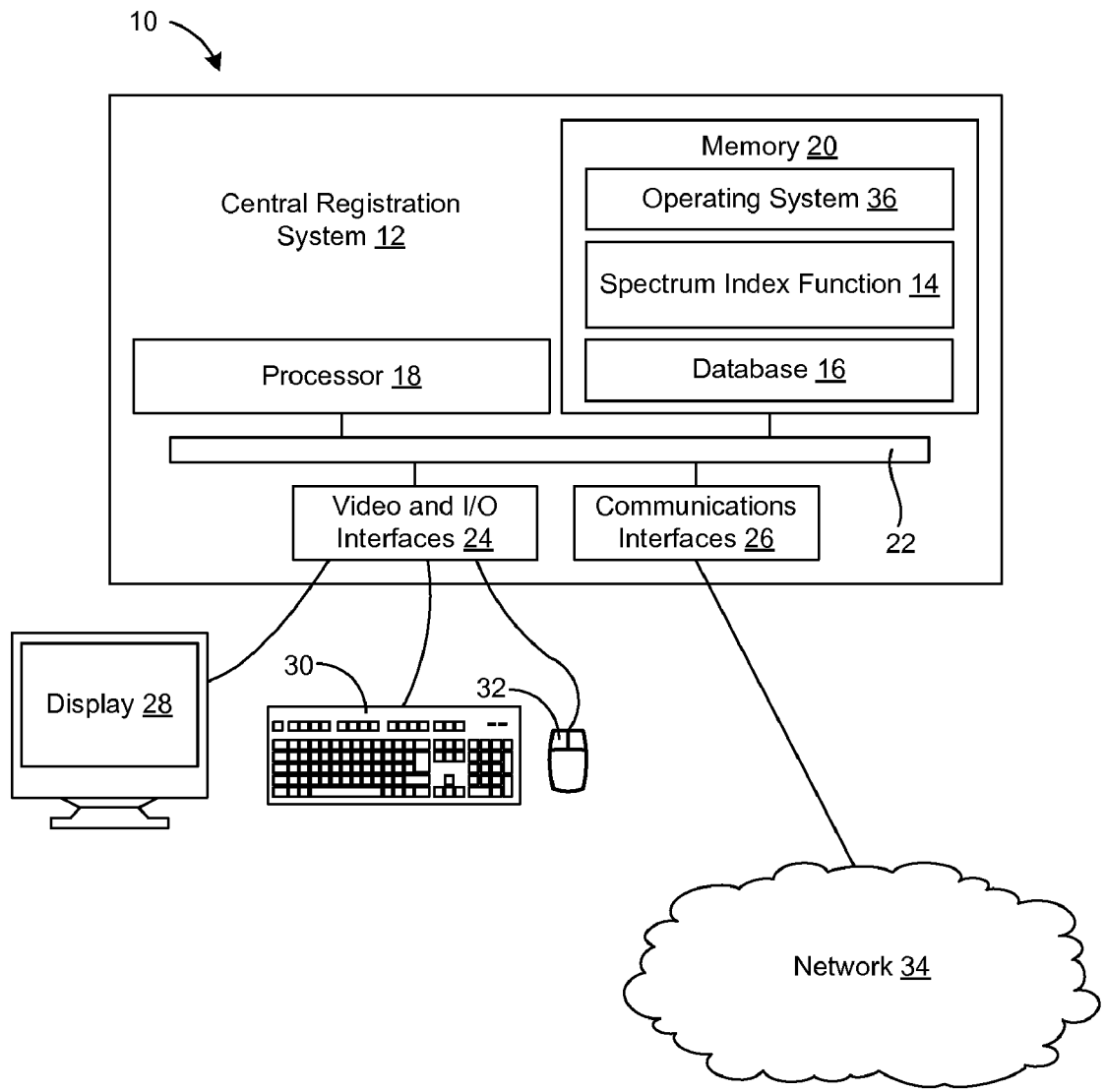

SYSTEM AND METHOD FOR ESTABLISHING AN INDEX FOR SPECTRUM USED TO SUPPORT WIRELESS COMMUNICATIONS

RELATED APPLICATION DATA

This application claims the benefit of U.S. Provisional Patent Application No. 61/215,455, filed May 6, 2009, the disclosure of which is incorporated herein by reference in its entirety.

TECHNICAL FIELD OF THE INVENTION

The technology of the present disclosure relates generally to valuing an intangible asset and, more particularly, to a system and method for establishing an index value for spectrum that is used to support wireless communications.

BACKGROUND

Wireless networks and systems are becoming increasingly popular. To enhance the availability and reliability of interference free spectrum, procedures that are governed by regulatory agencies (e.g., the Federal Communications Commission (FCC) in the United States) have been developed for allocating and regulating spectrum use. In the U.S., for example, the FCC licenses spectrum in a primary spectrum market to Commission licensees. A secondary market exists for the Commission licensees to sublease spectrum for use by other parties.

SUMMARY

According to one aspect of the disclosure, a system for valuing spectrum as a commodity includes an interface over which financial data for publically traded companies is received; and a processor configured to determine a spectrum index value as a function of the financial data for a plurality of selected publically traded companies and spectrum-related data for the selected companies.

According to another aspect of the disclosure, a computer readable medium storing a program to value spectrum as a commodity includes code to determine a spectrum index value as a function of financial data for a plurality of selected publically traded companies and spectrum-related data for the selected companies.

According to another aspect of the disclosure, a method of valuing spectrum as a commodity includes determining a spectrum index value as a function of financial data for a plurality of selected publically traded companies and spectrum-related data for the selected companies.

Features of the disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 1 is a schematic view of an exemplary system for establishing an index value for spectrum that is used to support wireless communications.

DETAILED DESCRIPTION OF EMBODIMENTS

Embodiments will now be described with reference to the drawings, wherein like reference numerals are used to refer to like elements throughout. It will be understood that the figures are not necessarily to scale.

In this document, described are various entities that may have a relationship to electromagnetic spectrum for use in wireless communications. Wireless communications includes bidirectional and unidirectional data exchanges. Also, wireless communications includes broadcasts for reception by plural devices and transmissions that are intended for a specific device.

One entity is a government or regulatory agency. In the United States, the governmental agency may be the FCC. The governmental agency controls the rules and/or regulations for how wireless spectrum may be used. Another exemplary agency is Ofcom in the United Kingdom.

Another party may be a publically traded company that offers services that rely on spectrum. Service companies typically will have rights in spectrum, such as the right to use spectrum or sublease spectrum to others. Typically, these companies are Commission licensees or the sub-licensees of Commission licensees. Exemplary service companies are mobile telephone service providers that offer data and voice services to mobile subscribers. As will be appreciated, other types of services are possible, such as two-way paging, microwave services, network backhaul services, and so forth. For purposes of this description, a service company may be considered a holder of spectrum rights.

Another party may be a publically traded equipment company that makes and/or sells devices that use spectrum to carry out functionality of the devices. Exemplary equipment companies are mobile telephone manufacturers, but a wide variety of other types of equipment could qualify a company as an equipment company. It will further be recognized that a publically traded company may be both a service company and an equipment company.

A. System Configuration

With reference to FIG. 1, illustrated is a schematic block diagram of a computer-based system 10 capable of executing computer applications (e.g., software programs). The system 10 may include a spectrum index generator 12 that is implemented using computer technology. The spectrum index generator 12 may be configured to execute a spectrum index function 14 and to store a database 16 that contains data that is used by the spectrum index function 14.

In one embodiment, the spectrum index function 14 is embodied as one or more computer programs (e.g., one or more software applications including compilations of executable code). The computer program(s) and/or database 16 may be stored on a computer readable medium, such as a memory in the form of a magnetic, optical or electronic storage device (e.g., hard disk, optical disk, flash memory, etc.).

To execute the function 14, the spectrum index generator 12 may include one or more processors 18 used to execute instructions that carry out a specified logic routine(s). In addition, the spectrum index generator 12 may have a memory 20 for storing data, logic routine instructions, computer programs, files, operating system instructions, and the like. As illustrated, the function 14 and the database 16 may be stored by the memory 20. The memory 20 may comprise several devices, including volatile and non-volatile memory components. Accordingly, the memory 20 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices. The processor 18 and the components of the memory 20 may be coupled using a local interface 22. The local interface 22 may be, for example, a data bus with accompanying control bus, a network, or other subsystem.

The spectrum index generator 12 may have various video and input/output (I/O) interfaces 24 as well as one or more communications interfaces 26. The interfaces 24 may be used to operatively couple the computer system 10 to various peripherals, such as a display 28, a keyboard 30, a mouse 32, other input devices, a microphone (not shown), a camera (not shown), a scanner (not shown), a printer (not shown), a speaker (not shown) and so forth. The communications interfaces 26 may include for example, a modem and/or a network interface card. The communications interfaces 26 may enable the system 10 to send and receive data signals, voice signals, video signals, and the like to and from other computing devices via an external network 34 (e.g., the Internet, a wide area network (WAN), a local area network (LAN), direct data link, or similar systems). The interface between the spectrum index generator 12 and any operatively interfaced device or network may be wired or wireless.

The memory 20 may store an operating system 36 that is executed by the processor 18 to control the allocation and usage of resources in the spectrum index generator 12, as well as provide basic user interface features. Specifically, the operating system 36 controls the allocation and usage of the memory 20, the processing time of the processor 18 dedicated to various applications being executed by the processor 18, and the peripheral devices, as well as performing other functionality. In this manner, the operating system 36 serves as the foundation on which applications, such as the function 14, depend as is generally known by those with ordinary skill in the art. The operating system 36 also may control much of the user interface environment presented to a user, such as features of the overall graphical user interface (GUI) for the spectrum index generator 12.

In one embodiment, the spectrum index generator 12 may be configured as a server that executes the function 14 to distribute a spectrum index value and other output information to other computer systems via the network 34.

B. Index Determination

B(1). Overview

The spectrum index generator 12 may be configured to generate one or more index values. Each index value provides a relative measure of changes in spectrum asset valuation over a period of time. In determining the index values, financial information related to a plurality of publically traded companies is combined with spectrum considerations. In this manner, the financial information is used as a proxy for the value of the spectrum itself.

This approach differs from the way that typical commodity index values are generated. Typical commodity indices are based on the value of the corresponding tangible asset that has a directly measurable value. For instance, an index value for travel may be based on the price of airline tickets between pairs of cities, a pork bellies index may be based on the price of pork products, a housing index may be based on the price of homes in certain geographic locations, and so forth.

Spectrum, however, is a more intangible asset in the sense that spectrum has no intrinsic value until there are products that make use of the spectrum and/or there are service providers that enable end users to employ spectrum for various purposes. To measure changes in spectrum asset value over time, a selection of publically traded companies is made. For each company (or "equity" due to the company's related stock trading data), financial information is combined with spectrum-related data that corresponds to the spectrum attributable to the company. The financial data used in the combination may be data that is representative of the contribution that the company has on giving value to spectrum. When combined with the spectrum related data, the result is an indirect representation value of otherwise intangible spectrum value assets. The spectrum related data assists in establishing this representation since financial data of a publically traded company, and particularly stock price of the company, is subject to many considerations other than the spectrum for which the company is a holder, for which the company makes or sells equipment, or for which the company has an influence.

The resulting value for the company undergoes weighting. The weighted values for each company are then combined to determine a score. The score is compared to a prior score to determine a percent change in spectrum value and determine a corresponding spectrum index value.

B(2). Detailed Index Determination

The following description is based on an example of determining an index value and monitoring the index value change over time. It will be appreciated that modifications may be made, including changing the number of equity components, changing the exemplary equities (e.g., using different companies than those in the example), changing the weighting values, and so forth. Also, the exemplary index determination approach is based on the described combination of financial data and spectrum-related data, and on the described weighting approaching. It will be appreciated that the spectrum value for each company may be determined using a different combination of financial data and spectrum-related data. Also, the weighting approaching may be altered. In addition, the scores may be combined in a different manner to establish the final spectrum index value.

The description will initially make reference to Tables 1 and 2. Tables 1 and 2 include financial information and spectrum-related information that are combined to determine the spectrum value for each company. Tables 1 and 2 further include weighting of the spectrum values to establish the score for each company. Table 1 shows data for a first trading session and Table 2 shows data for a second trading session. In one embodiment, the second trading session is the trading session that immediately follows the first trading session. A session is also referred to as a "day." In this manner, when a cumulative score for the second trading day is compared to a cumulative score for the first trading day, a "daily" change in value (or change in spectrum value versus the prior day) may be determined. In the described example, the second trading session corresponds to a current day's session (e.g., "today") and the first trading session corresponds to a prior day's session (e.g., "yesterday" or the next earlier session if markets were closed "yesterday"). If n refers to the current trading session, then n+1 may refer to prior day's trading session. Also, n+1 may refer to the next following trading session, n+2 may refer to next subsequent trading session, and so forth.

TABLE 1

| Equity Name and Ticker Symbol | Enterprise Value ($ Millions) | Net Asset Value ($ Millions) | Interim Spectrum Value | MHz·Pop (Millions) | Spectrum Value ($/MHz·Pop) | First Weight Factor (Si) | Second Weight Factor (Wi) | Score |
|---|---|---|---|---|---|---|---|---|
| AT&T (ATT) | $302,695.28 | $96,238.00 | $206,457.28 | 148,453 | $1.39 | 0.518 | 1.00 | 0.72 |
| Clearwire (CLWR) | $2,973.31 | $601.01 | $2,372.30 | 835 | $2.84 | 0.003 | 1.06 | 0.01 |
| Leap Wireless (LEAP) | $4,786.49 | $1,389.87 | $3,396.62 | 2,183 | $1.56 | 0.008 | 0.96 | 0.01 |
| Metro PCS (PCS) | $7,610.61 | $2,038.19 | $5,572.41 | 5,121 | $1.09 | 0.018 | 0.95 | 0.02 |
| Qualcomm (QCOM) | $59,975.81 | $1,817.00 | $58,158.81 | 32,903 | $1.77 | 0.115 | 1.00 | 0.20 |
| Sierra Wireless (SWIR) | $311.02 | $17.68 | $293.34 | 15 | $19.15 | 0.000 | 0.94 | 0.00 |
| Sprint (S) | $38,601.44 | $26,434.00 | $12,167.44 | 5,191 | $2.34 | 0.018 | 1.12 | 0.05 |
| USA Mobility (USMO) | $126.03 | $69.65 | $56.38 | 93 | $0.61 | 0.000 | 1.00 | 0.00 |
| Verizon (VZ) | $166,449.32 | $84,484.00 | $81,965.32 | 91,694 | $0.89 | 0.320 | 0.95 | 0.27 |
| Airspan (AIRN) | $30.97 | $5.72 | $25.25 | 13 | $1.98 | 0.000 | 0.89 | 0.00 |
| Proxim Wireless (PRXM) | $13.74 | $2.42 | $11.32 | 2 | $5.50 | 0.000 | 0.91 | 0.00 |

Cumulative Score ($R_{n-1}$): 1.29

TABLE 2

| Equity Name and Ticker Symbol | Enterprise Value ($ Millions) | Net Asset Value ($ Millions) | Interim Spectrum Value | MHz·Pop (Millions) | Spectrum Value ($/MHz·Pop) | First Weight Factor (Si) | Second Weight Factor (Wi) | Score |
|---|---|---|---|---|---|---|---|---|
| AT&T (ATT) | $222,712.20 | $99,088.00 | $123,624.20 | 148,453 | $0.83 | 0.518 | 1.00 | 0.43 |
| Clearwire (CLWR) | $1,683.75 | $650.34 | $1,033.41 | 835 | $1.24 | 0.003 | 1.06 | 0.00 |
| Leap Wireless (LEAP) | $4,493.35 | $1,842.72 | $2,650.63 | 2,183 | $1.21 | 0.008 | 0.96 | 0.01 |
| Metro PCS (PCS) | $8,308.21 | $2,847.75 | $5,460.63 | 5,121 | $1.07 | 0.018 | 0.95 | 0.02 |
| Qualcomm (QCOM) | $52,531.98 | $2,262.00 | $50,269.98 | 32,903 | $1.53 | 0.115 | 1.00 | 0.18 |
| Sierra Wireless (SWIR) | $7.37 | $22.94 | -$15.56 | 15 | $0.00 | 0.000 | 0.94 | 0.00 |
| Sprint (S) | $28.262.17 | $22,373.00 | $5,889.17 | 5,191 | $1.13 | 0.018 | 1.12 | 0.02 |
| USA Mobility (USMO) | $140.12 | $57.87 | $82.26 | 93 | $0.89 | 0.000 | 1.00 | 0.00 |
| Verizon (VZ) | $163,594.19 | $86,546.00 | $77,048.19 | 91,694 | $0.84 | 0.320 | 0.95 | 0.25 |
| Airspan (AIRN) | -$8.04 | $5.12 | -$13.16 | 13 | $0.00 | 0.000 | 0.89 | 0.00 |
| Proxim Wireless (PRXM) | -$0.80 | $2.45 | -$3.25 | 2 | $0.00 | 0.000 | 0.91 | 0.00 |

Cumulative Score ($R_n$): 0.92

As indicated, the companies used in the determination of the spectrum index value may be selected for their contribution to the value of spectrum in terms of offering services and/or equipment that makes spectrum applications available to others and/or otherwise "creates" value in spectrum. The companies may be selected to adjust the overall composition of the spectrum index value. For example, in one embodiment, the companies may be selected to reflect a wide range of types of spectrum use over a variety of bands. In this manner, a resulting spectrum index value may be reflective of overall spectrum value.

In other embodiments, the companies may be selected to reflect a certain type of spectrum use and/or certain frequency bands. Under this approach, a resulting spectrum index value may be reflective of spectrum value for a corresponding "spectrum sector" having a related wireless application, type of service, frequency range, or other consideration. Exemplary spectrum sectors may include telecommunications hardware and equipment, broadband (e.g., 3-G services), mobile telephone carriers, narrow-band, microware and backhaul service, and so forth. It is possible that certain companies may contribute to more than spectrum sector. If sufficient financial data exists to attribute portions of the financial data to a specific sector, then only that financial data may be used in the corresponding spectrum sector index determination. In other cases, the level of detail with respect to the financial data may not be available to attribute portions of the data to a particular sector. In this case, the complete financial data may be used in the determination of the spectrum sector index value and a weighting factor (described below) may be selected to downwardly adjust the company's impact on the spectrum sector index.

Using companies in existence at the time that this document was written, the grouping of companies in Tables 1 and 2 represents an exemplary grouping of companies that may be used to determine an overall (or "composite") spectrum index. An exemplary grouping of companies for a telecommunications hardware and equipment spectrum sector index may include RFMD, Tessco, Qualcomm, CalAmp, Apple, Nokia, Motorola, and Research In Motion. An exemplary grouping of companies for a broadband spectrum sector index may include Airspan, Alvarion, Clearwire, and Proxim Wireless. An exemplary grouping of companies for a mobile telephone carrier spectrum sector index may include AT&T, T-Mobile, Verizon, Sprint, Alcatel/Lucent, Nortel, Sierra Wireless, Metro PCS, and Leap Wireless. An exemplary grouping of companies for a narrow-band spectrum sector index spectrum sector index may include Motorola, American Tower, Tait, USA Mobility, and Crown Castle. An exemplary grouping of companies for a microware and backhaul service spectrum sector index may include Crown Castle and FiberTower Corporation.

The spectrum index values and changes from a prior value may be determined once daily (e.g., at the end of the trading day) or dynamically throughout the trading day as financial data for the corporate components of the spectrum index changes. Weekly, monthly, quarterly, yearly, year to date and/or other changes in index value also may be determined.

Referring to Tables 1 and 2, the determination of a daily score from which spectrum index value and changes from a prior value are determined will now be explained.

For each company used in the determination of a spectrum index, an enterprise value may be determined. Enterprise value may be determined from publically available information about the company. The publically available information may be provided by a data service via the network 34, for example. The service may provide the enterprise value itself or data values from which the enterprise value may be determined. For instance, enterprise value may be determined by adding the company's long term debt (e.g., as reflected on the company's balance sheets) to the company's market capitalization and then subtracting the company's total cash (e.g., as reflected on the company's balance sheets). Market capitalization may be determined by multiplying the company's current stock price by the number of shares outstanding.

For each company in the determination of the spectrum index, a net asset value (also referred to a net fixed asset value) may be determined. Net asset value may be determined by subtracting accumulated depreciation from the company's property plant and equipment value. These amounts also may be derived from the company's balance sheets.

Next, for each company, an interim spectrum value may be determined. The interim spectrum value may be determined by subtracting the net asset value from the enterprise value.

For each company in the determination of the spectrum index, a spectrum-related data value may be determined. The spectrum-related data value may be combined with the interim spectrum value to determine a spectrum value for the company. In one embodiment, the spectrum-related data value is a function of the amount of spectrum that the company has a right to use or otherwise influences by its corporate actions and of a population of people that are present in the geographic area for that spectrum The amount of spectrum may be expressed in megahertz (MHz) and the population may be expressed in number of people. Multiplying the amount of spectrum by the population gives a megahertz-population (MHz·Pop) value.

In one embodiment, the spectrum value may be determined by dividing the interim spectrum value by the MHz·Pop value. In this embodiment, the spectrum value for each company is expressed in terms of currency per MHz·Pop. In the United States, for example, the spectrum value may then be a value expressed in dollars per MHz·Pop. Any negative spectrum values may be treated as equaling zero.

Next, the spectrum value may be weighted using one or more weighting factors. In one embodiment, the spectrum value is weighted using two weighting factors. A first weighting factor may be an objective measure of the company's spectrum influence compared to other companies used in determining the index. In the example of Tables 1 and 2, the first weighting factor is referred to as Si and is a ratio of MHz·Pop for the company to the total MHz·Pop of all the companies in the index. Therefore, the first weighting factor for each company may range from zero to one. In this described embodiment, the value is carried out to three decimal places. Companies that have a MHz·Pop value that is less than a threshold percentage of the total MHz·Pop of all the companies in the index may have a corresponding first weighting factor that is set to zero.

A second weighting factor may be a subjective measure of the company's spectrum influence compared to other companies used in determining the index. The subjective weighting factor, however, may be determined from one or more assigned, calculated and/or objective input values. The second weighting factor may be based on relative importance of the company to the spectrum market. Various rules and guidelines may be used in determining the second weighting factor. One contributing factor to the second weighting factor may be equipment availability and/or equipment sales for devices that support various types of wireless applications. Another factor may be the importance of the company's spectrum to applications that are in use by spectrum users. As a more specific example, two-way paging once was a popular application for spectrum, but more recently has lost popularity in favor of mobile telephone technology, which supports functions such as calling and messaging (e.g., text messaging, instant messaging, multimedia messaging, and electronic mail messaging). Therefore, at the current time, mobile telephone providers may receive a higher second weighting factor than a company that provides two-way paging services. But if a new application arises that makes use of the spectrum in which the two-way paging company has use rights, then the second weighing factor of the two-way paging company may rise.

The second weighting factor is referred to as Wi and may be a value that is less than one, more than one, or equal to one. As will become clearer below, a value equal to one has no impact on a company's contribution to the spectrum index. A value that is less than one will reduce the company's contribution to the spectrum index. A value that is more than one will increase the company's contribution to the spectrum index.

Using the spectrum values and weighting factors, a score may be determined for each company. In the embodiment of Tables 1 and 2, the score for each company may be determined by multiplying the company's spectrum value by the first weighting factor and by the second weighting factor as set forth in equation 1.

$$\text{Score} = (\text{Spectrum Value}) \cdot (Si) \cdot (Wi) \quad \text{Eq. 1}$$

The individual scores for each company may then be summed together to establish a cumulative score (R) for the trading session.

Next, the cumulative score for the current trading session (or $R_n$) may be compared to the cumulative score for the immediately prior trading session (or $R_{n-1}$). In one embodiment, a ratio is taken between the two cumulative scores to establish an indication of how much the cumulative score changed. For instance, change score (A) may be determined in accordance with equation 2.

$$A = \frac{R_n}{R_{n-1}} \quad \text{Eq. 2}$$

From the example of Tables 1 and 2, A would be 0.713 (or 0.92 divided by 1.29).

An index value may be initially established using an arbitrary value, such as one, one hundred, or one thousand. In the following examples, an initial index value of one hundred will be used. The initial index value may be used as the index value for the close of the first day that the index is tracked. For purposes of an example, the first tracking day will be considered the day that resulted in a cumulative score of $R_{n-1}$. The index value will be referred to as SIV for "spectrum index value."

A percentage change in the index value may be determined using the change score A in accordance with equation 3, where alpha ($\alpha$) is a baseline value and is set to 1.00 in the examples that follow.

$$\% \text{ Change} = (\alpha) \cdot (A-1) \cdot (100) \quad \text{Eq. 3}$$

From the example of Tables 1 and 2, the % change would be −28.6% when rounded to one decimal place.

A new index value for the current trading session (or $SIV_n$) may be determined using equation 4.

$$SIV_n = (SIV_{n-1}) \cdot (1 + \% \text{ Change})/100 \quad \text{Eq. 4}$$

Continuing the prior examples, Table 3 shows an example of the determination of three additional trading sessions, but it will be understood that determination of the spectrum index value may continue indefinitely.

TABLE 3

| Day | Cumulative Score (R) | Change Score (A) | % Change | Spectrum Index Value (SIV) |
|---|---|---|---|---|
| n − 1 | 1.29 | none | none | 100.0 |
| n | 0.92 | 0.71 | −28.6 | 71.4 |
| n + 1 | 1.00 | 1.09 | 9.0 | 77.8 |
| n + 2 | 0.90 | 0.90 | −10.0 | 70.0 |
| n + 3 | 1.10 | 1.22 | 22.2 | 85.6 |

C. Conclusion

Although certain embodiments have been shown and described, it is understood that equivalents and modifications falling within the scope of the appended claims will occur to others who are skilled in the art upon the reading and understanding of this specification.

What is claimed is:

1. A system for valuing spectrum as a commodity, comprising:
   an interface over which financial data for publically traded companies is received; and
   a processor configured to determine a spectrum index value as a function of the financial data for a plurality of selected publically traded companies and spectrum-related data for the selected companies;
   wherein determining the spectrum index value includes:
      for each company, determine a spectrum value that is representative of a contribution of the company on giving rise to value to spectrum;
      weight the spectrum values for each company; and
      combine the weighted spectrum values and convert the combined weighted spectrum values to the spectrum index value; and
   wherein the spectrum value for each company is weighted by a two weighting factors that include an objective weighting factor and a subjective weighting factor; and
   wherein determining the spectrum value for each company includes:
      determine an interim spectrum value for the company, the interim spectrum value being an enterprise value for the company minus a net asset value for the company; and
      divide the interim spectrum value for the company by a spectrum-related data value for the company, the spectrum-related data value being a function of an amount of spectrum that the company has a right to use or influence by corporate actions and a function of a population of people that are present in a geographic area for the amount of spectrum.

2. The system of claim 1, wherein the contribution of the company is in terms of offering services or equipment that makes a spectrum application available to wireless radio users.

3. The system of claim 1, wherein the spectrum-related data value is expressed in terms of megahertz-population (MHz·Pop).

4. The system of claim 1, wherein the objective weighting factor is a measure of the spectrum influence of the company compared to the total spectrum influence of the plurality of the companies.

5. The system of claim 4, wherein the spectrum influence is a function of an amount of spectrum that the company has a right to use or influence by corporate actions and a function of a population of people that are present in a geographic area for the amount of spectrum.

6. The system of claim 1, wherein the subjective weighting factor is a measure of relative importance of the company to the spectrum market.

7. The system of claim 1, wherein the changes in the spectrum index value are monitored over time.

8. A method of valuing spectrum as a commodity, comprising:
   determining, by a computer, a spectrum index value as a function of financial data for a plurality of selected publically traded companies and spectrum-related data for the selected companies;

wherein determining the spectrum index value includes:
  for each company, determining a spectrum value that is representative of a contribution of the company on giving rise to value to spectrum;
  weighting, by the computer, the spectrum values for each company; and
  combining, by the computer, the weighted spectrum values and converting the combined weighted spectrum values to the spectrum index value; and
wherein the spectrum value for each company is weighted by a two weighting factors that include an objective weighting factor and a subjective weighting factor; and
wherein determining the spectrum value for each company includes:
  determining, by the computer, an interim spectrum value for the company, the interim spectrum value being an enterprise value for the company minus a net asset value for the company; and
  dividing, by the computer, the interim spectrum value for the company by a spectrum-related data value for the company, the spectrum-related data value being a function of an amount of spectrum that the company has a right to use or influence by corporate actions and a function of a population of people that are present in a geographic area for the amount of spectrum.

9. The method of claim 8, wherein the contribution of the company is in terms of offering services or equipment that makes a spectrum application available to wireless radio users.

10. The method of claim 8, wherein the spectrum-related data value is expressed in terms of megahertz-population (MHz·Pop).

11. The method of claim 8, wherein the objective weighting factor is a measure of the spectrum influence of the company compared to the total spectrum influence of the plurality of the companies.

12. The method of claim 11, wherein the spectrum influence is a function of an amount of spectrum that the company has a right to use or influence by corporate actions and a function of a population of people that are present in a geographic area for the amount of spectrum.

13. The method of claim 8, wherein the subjective weighting factor is a measure of relative importance of the company to the spectrum market.

14. The method of claim 8, further comprising monitoring changes in the spectrum index value over time.

* * * * *